US009382758B2

(12) United States Patent
Kennedy

(10) Patent No.: US 9,382,758 B2
(45) Date of Patent: *Jul. 5, 2016

(54) STAIR SYSTEM FOR OILFIELD TANK

(71) Applicant: WICHITA TANK MANUFACTURING, LTD., Wichita Falls, TX (US)

(72) Inventor: Theron Jim Kennedy, Wichita Falls, TX (US)

(73) Assignee: Wichita Tank Manufacturing, Ltd., Wichita Falls, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,354

(22) Filed: Mar. 3, 2014

(65) Prior Publication Data

US 2014/0174851 A1    Jun. 26, 2014

Related U.S. Application Data

(63) Continuation-in-part of application No. 13/359,644, filed on Jan. 27, 2012, now Pat. No. 8,662,250, which is a continuation-in-part of application No. 12/333,892, filed on Dec. 12, 2008, now Pat. No. 8,113,314.

(51) Int. Cl.
| | | |
|---|---|---|
| *E04G 3/00* | (2006.01) | |
| *E06C 5/04* | (2006.01) | |
| *B60R 3/02* | (2006.01) | |

(52) U.S. Cl.
CPC .... *E06C 5/04* (2013.01); *B60R 3/02* (2013.01)

(58) Field of Classification Search
CPC ............... E06C 5/04; E06C 7/16; B60R 3/02; B60R 3/005; B60R 3/002

USPC .......... 182/83, 84, 85, 86, 62.5, 106, 95, 127
See application file for complete search history.

(56) References Cited

U.S. PATENT DOCUMENTS

| | | | | |
|---|---|---|---|---|
| 31,216 | A * | 1/1861 | Sprague | 182/62.5 |
| 159,571 | A | 2/1875 | Fuchslocher | |
| 289,726 | A | 12/1883 | Tevis | |
| 1,713,730 | A | 5/1929 | Wright | |
| 1,930,992 | A * | 10/1933 | Bessler | 182/80 |
| 1,944,159 | A * | 1/1934 | Bailey | 182/1 |
| 2,933,149 | A | 4/1960 | Lee | |
| 3,067,835 | A | 8/1960 | Valley | |
| 2,978,062 | A * | 4/1961 | Di Camillo et al. | 182/1 |
| 2,981,363 | A * | 4/1961 | Kestutis al. | 182/84 |

(Continued)

OTHER PUBLICATIONS

Dragon Products Ltd, Connecting Catwalk Corrugated Wall Liquid Storage, date of publication is unknown Internet address: http://www.dragonproductsltd.com/tanks/fr%20corrugated%20wall%20connecting.htm.

(Continued)

*Primary Examiner* — Katherine Mitchell
*Assistant Examiner* — Johnnie A Shablack
(74) *Attorney, Agent, or Firm* — James E. Walton

(57) ABSTRACT

A mobile oilfield storage tank includes a wall and a stair system securely coupled to the wall. The stair system a platform suitable for use as a walkway and a platform extension pivotally engaged with the platform. The platform extension pivots from a folded position to an extended position and creates a continuous walkway between the platform and a platform of an adjacent mobile oilfield storage tank.

20 Claims, 16 Drawing Sheets

(56) References Cited

U.S. PATENT DOCUMENTS

| | | | |
|---|---|---|---|
| 3,047,093 A | | 7/1962 | Cruz |
| 3,083,784 A | * | 4/1963 | Urian .................. 182/88 |
| 3,608,669 A | * | 9/1971 | Lindsay, Jr. ............ 182/14 |
| 3,709,322 A | * | 1/1973 | Mitchell .............. 182/62.5 |
| 4,004,652 A | * | 1/1977 | Laboy-Alvarado ...... 182/118 |
| 4,014,486 A | | 3/1977 | Nelson et al. |
| 4,171,550 A | * | 10/1979 | Phaup ................. 14/71.1 |
| 4,333,196 A | * | 6/1982 | Bougaran .............. 14/71.7 |
| 4,438,830 A | * | 3/1984 | Born .................. 187/201 |
| 4,669,574 A | | 6/1987 | Moutot |
| 4,776,429 A | * | 10/1988 | Osborn ................ 182/144 |
| 4,787,111 A | | 11/1988 | Pacek et al. |
| 5,026,244 A | | 6/1991 | Dorn |
| 5,027,922 A | | 7/1991 | Benko et al. |
| 5,042,612 A | * | 8/1991 | Bennett et al. .............. 182/1 |
| 5,064,022 A | | 11/1991 | Graham |
| 5,154,569 A | | 10/1992 | Eryou et al. |
| 5,213,367 A | | 5/1993 | Norman, Jr. et al. |
| 5,392,878 A | * | 2/1995 | Bennett et al. ............ 182/115 |
| 5,553,990 A | | 9/1996 | Kytola |
| 5,845,356 A | | 12/1998 | Kielinski |
| 5,921,531 A | * | 7/1999 | Early ................... 256/67 |
| 6,152,492 A | | 11/2000 | Markham et al. |
| D442,520 S | | 5/2001 | Wade |
| 6,279,955 B1 | | 8/2001 | Fisher |
| 6,375,222 B1 | | 4/2002 | Wade |
| 6,390,325 B1 | | 5/2002 | Gonzales |
| 6,598,704 B2 | | 7/2003 | Hansen |
| 6,598,705 B2 | * | 7/2003 | Ito et al. ................. 184/6.5 |
| 6,981,572 B2 | | 1/2006 | Hedley |
| 6,986,402 B2 | * | 1/2006 | Hedley et al. ............. 182/95 |
| 7,004,286 B2 | | 2/2006 | Fredette |
| 7,025,174 B1 | | 4/2006 | Hawley |
| 7,140,467 B2 | | 11/2006 | Cook |
| 7,244,123 B1 | * | 7/2007 | Barron ................. 434/226 |
| 7,296,640 B2 | | 11/2007 | Tettleton |
| 7,469,915 B2 | * | 12/2008 | Horn et al. ............... 280/163 |
| 7,516,997 B2 | | 4/2009 | Kuznarik et al. |
| 7,762,588 B2 | | 7/2010 | Markham |
| 7,775,169 B2 | | 8/2010 | Horn et al. |
| 7,832,525 B2 | | 11/2010 | Bennett et al. |
| 8,113,314 B2 | * | 2/2012 | Kennedy .................. 182/84 |
| 8,662,250 B2 | * | 3/2014 | Kennedy .................. 182/84 |
| 8,801,041 B2 | * | 8/2014 | Barrett et al. ............. 280/837 |
| 8,893,853 B2 | * | 11/2014 | Kennedy .................. 182/84 |
| 2001/0030081 A1 | | 10/2001 | Morimoto et al. |
| 2004/0159492 A1 | | 8/2004 | Hedley et al. |
| 2006/0272896 A1 | | 12/2006 | Rajewski |
| 2007/0125598 A1 | | 6/2007 | Castagno et al. |
| 2007/0256893 A1 | | 11/2007 | Horn et al. |
| 2008/0006304 A1 | * | 1/2008 | Treherne et al. ............. 134/34 |
| 2009/0078502 A1 | * | 3/2009 | Knurr .................... 182/13 |
| 2009/0145692 A1 | | 6/2009 | Flickinger et al. |
| 2010/0013206 A1 | * | 1/2010 | Markham ................ 280/837 |
| 2012/0024629 A1 | * | 2/2012 | Berry et al. .............. 182/113 |
| 2012/0025507 A1 | * | 2/2012 | Berry et al. .............. 280/769 |
| 2012/0125713 A1 | * | 5/2012 | Kennedy .................. 182/84 |
| 2013/0193666 A1 | * | 8/2013 | Kibler ................... 280/163 |

OTHER PUBLICATIONS

Office Action dated Jul. 22, 2011 from counterpart U.S. Appl. No. 12/333,892.

Amendment dated Sep. 22, 2011 from counterpart U.S. Appl. No. 12/333,892.

Interview Summary dated Sep. 26, 2011 from counterpart U.S. Appl. No. 12/333,892.

Notice of Allowance dated Oct. 19, 2011 from counterpart U.S. Appl. No. 12/333,892.

Office Action dated Feb. 21, 2013 from counterpart U.S. Appl. No. 13/359,644.

Amendment dated May 21, 2013 from counterpart U.S. Appl. No. 13/359,644.

Final Office Action dated Jun. 22, 2013 from counterpart U.S. Appl. No. 13/359,644.

Amendment After Final dated Aug. 21, 2013 from counterpart U.S. Appl. No. 13/359,644.

Notice of Allowance dated Oct. 11, 2013 from counterpart U.S. Appl. No. 13/359,644.

Office Action dated Jan. 6, 2014 from counterpart U.S. Appl. No. 13/592,987.

* cited by examiner

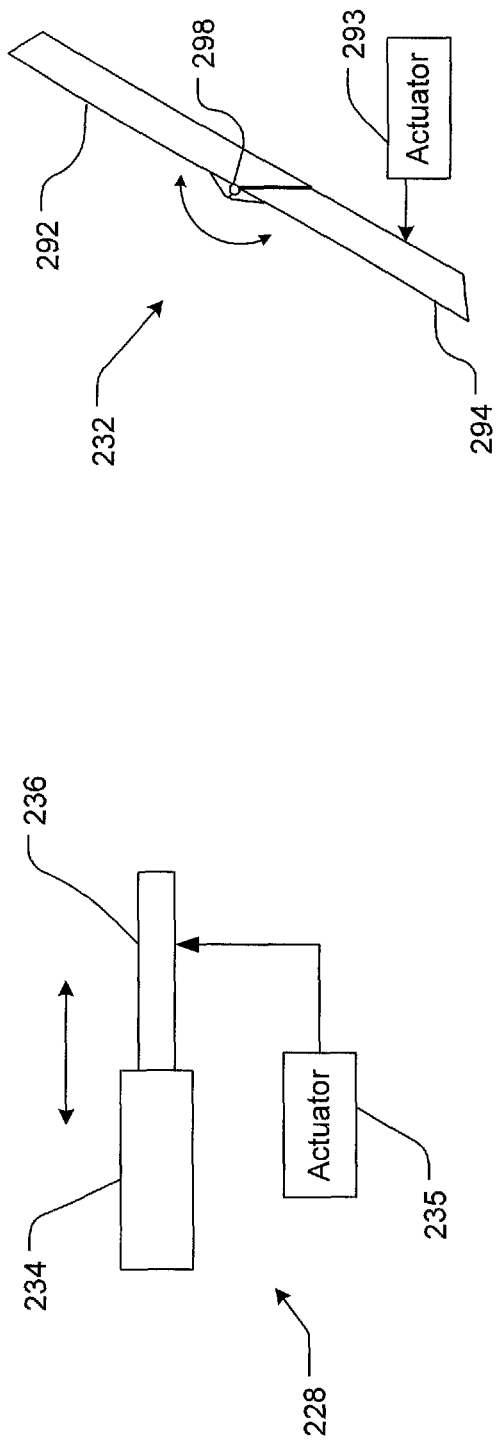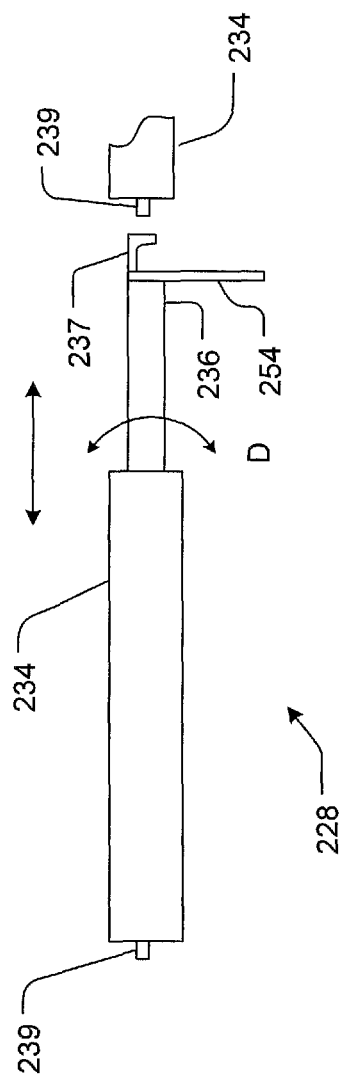

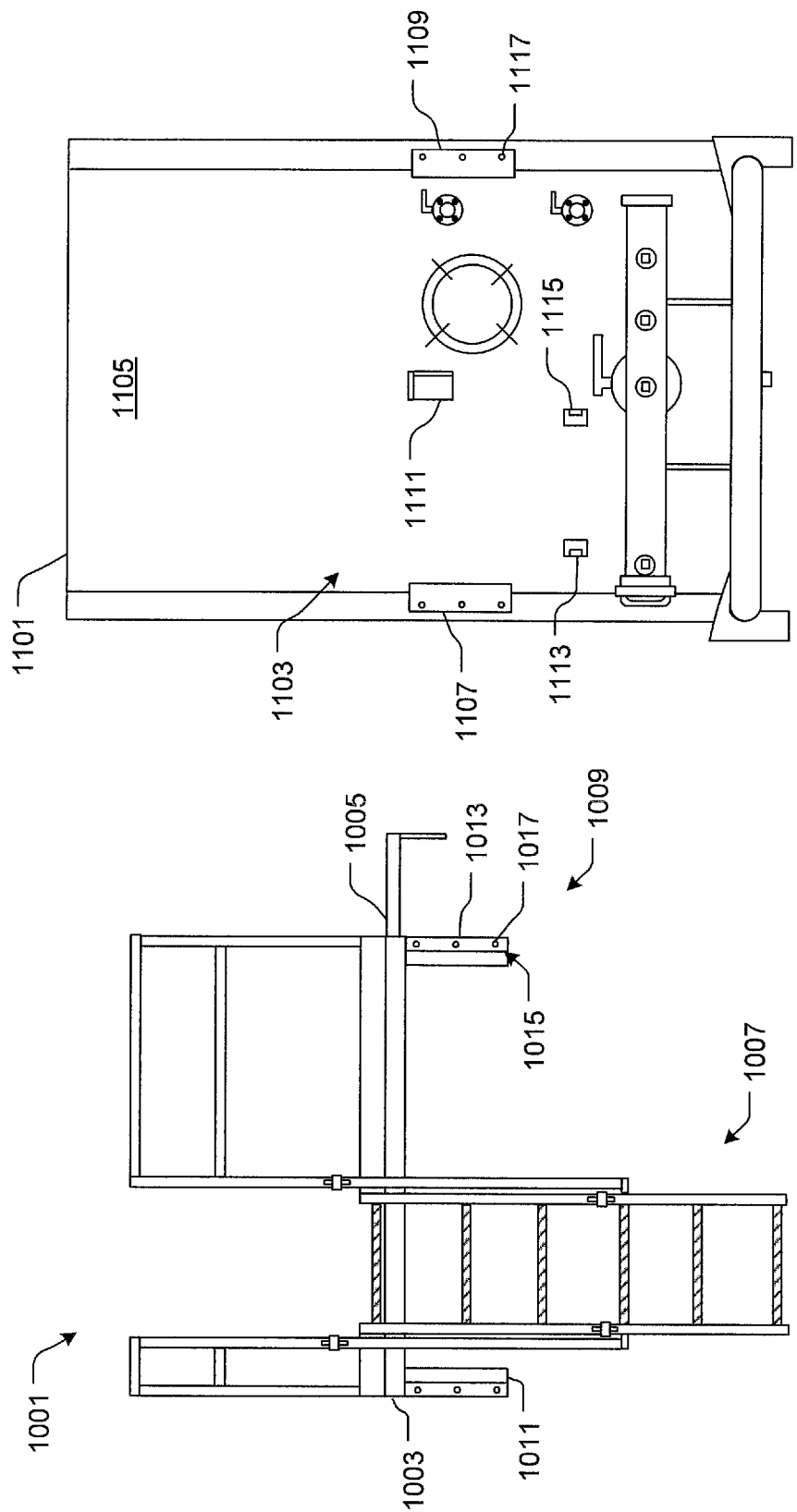

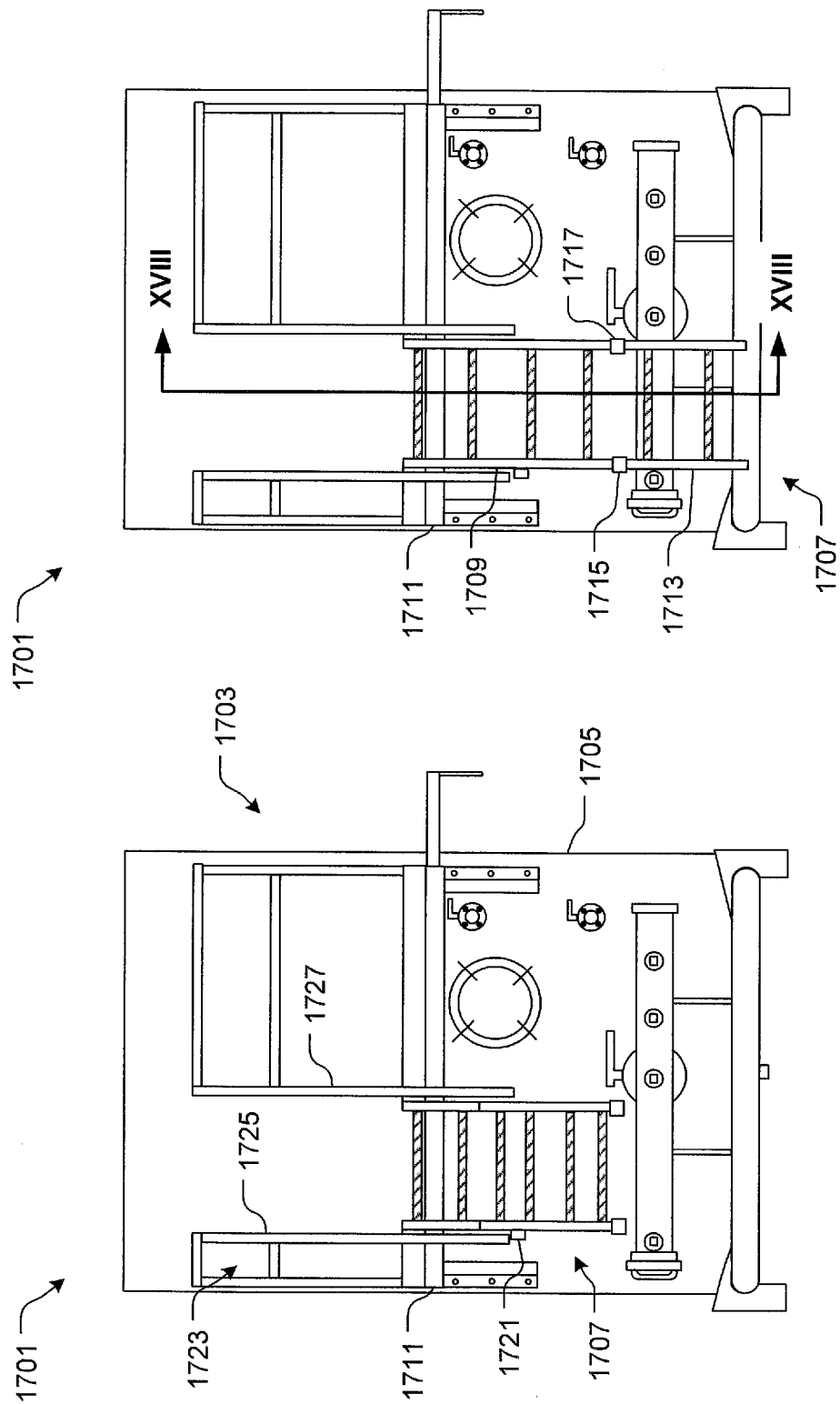

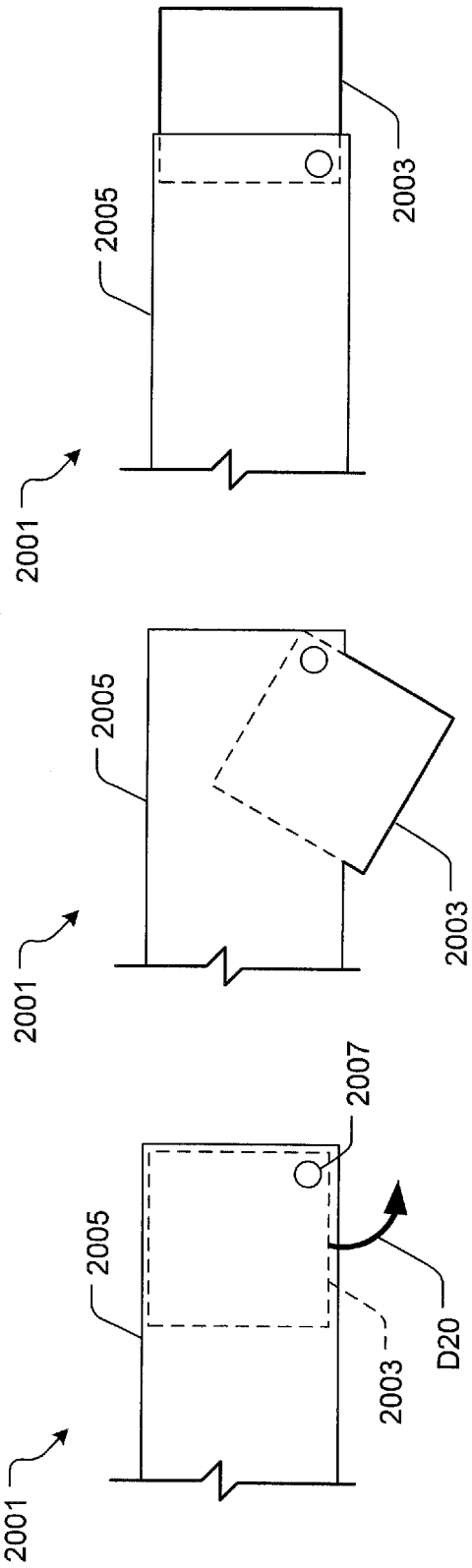

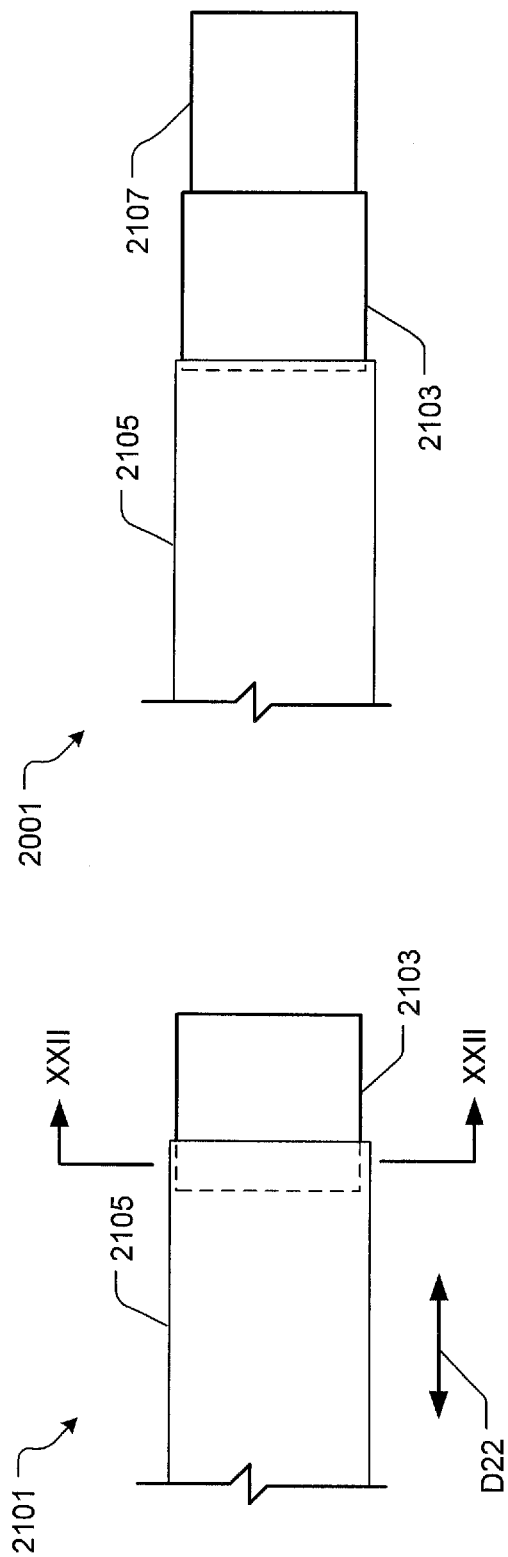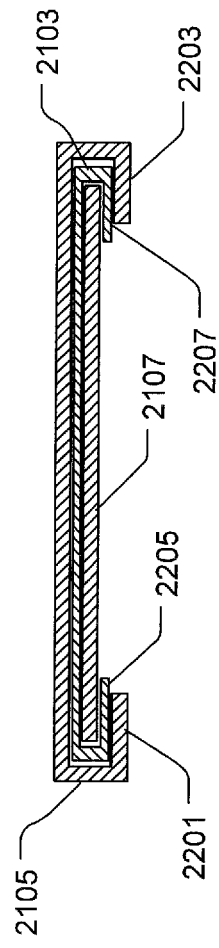

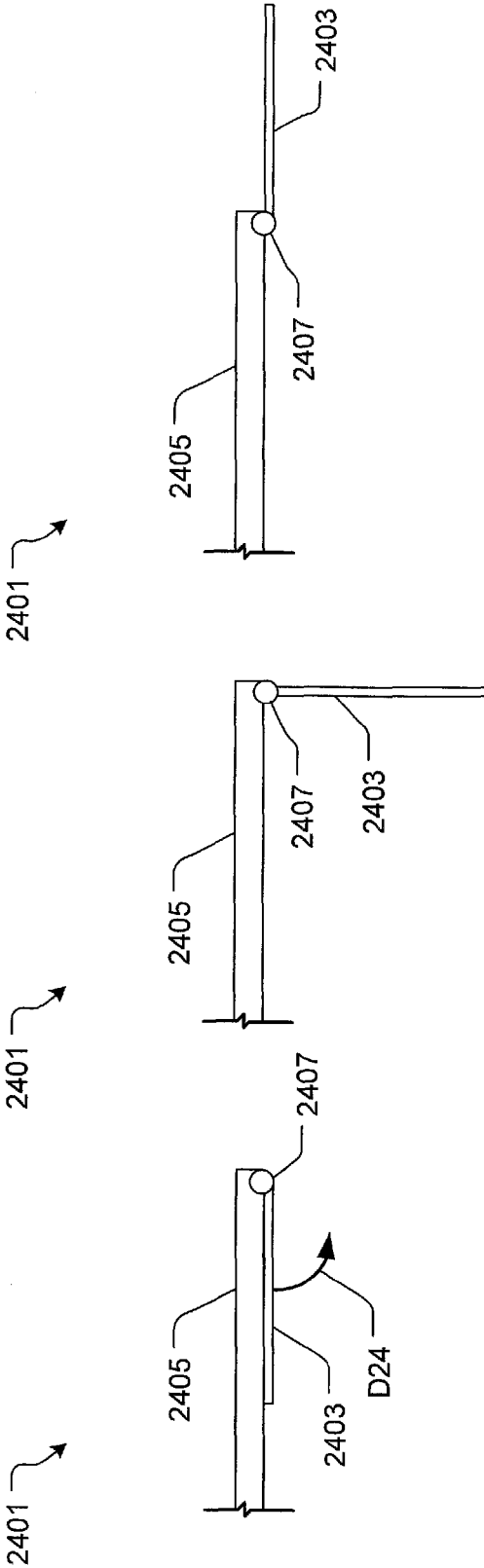

STAIR SYSTEM FOR OILFIELD TANK

BACKGROUND

1. Field of the Invention

The present application relates generally to mobile storage tanks, and more specifically, to a mobile storage tank having a removably stair system.

2. Description of Related Art

Stair systems for mobile oilfield tanks are provided with a staircase attached to a platform for access to the top surface of the tank. FIG. 1 shows a conventional stair system 100 having a staircase 102 and a platform 104 attached to a wall surface 106. Staircase 102 carries a plurality of stairs 108 and a hand rail 110 for providing support and security as the worker climbs staircase 102. It should be understood that stair system 100 rigidly attaches to the storage tank, which can require significant time and cost associated with the painting process and during the process of removing a damaged stair system.

During operation, a plurality of oilfield tanks are positioned side-by-side and joined together with one or more tubing networks to create a large reservoir for storing and dispensing liquids such as fracturing fluids, drilling mud, crude oil, and various other liquids or slurries. A well-known problem with the conventional stair system is that the worker must climb and descend each staircase to get from one tank to another; and, the worker must step over tubing, manifolds, and other devices operably associated with the oilfield tanks, which can be a time consuming and dangerous process. For example, FIG. 1 shows tubing 112, 114 attached to valves 116, 118, respectively. Tubing 112, 114 are shown lying on ground 120 and exposed to rain, ice, snow, or fluids stored or dispensed by the oilfield tank. The tubing could be caked with mud or other slippery substances. Tubing also has a propensity to move with pressure fluctuations. A worker could easily trip on the tubing, manifolds, and other devices when traveling between stair systems.

Although the foregoing developments represent great strides in the area of mobile storage tanks, many shortcomings remain.

DESCRIPTION OF THE DRAWINGS

The novel features believed characteristic of the system are set forth in the appended claims. However, the system itself, as well as a preferred mode of use, and further objectives and advantages thereof, will best be understood by reference to the following detailed description when read in conjunction with the accompanying drawings, wherein:

FIG. 7 is a block diagram showing an actuator for extending and retracting a retractable platform extension;

FIG. 8 is a block diagram showing an actuator for extending and retracting a staircase;

FIG. 9 is a side view of an embodiment of the platform subsystem configured for rigidly attaching to a neighboring platform subsystem;

FIG. 10 is a front view of a removable stair system;

FIG. 11 is a front view of a mobile storage tank;

FIGS. 17A and 17B are front views of the mobile storage tank and the removable stair system of FIG. 12;

FIGS. 20A, 20B, and 20C are top views of a platform of the stair system according to an alternative embodiment of the present application;

FIGS. 21A and 21B are top views of a platform of the stair system according to an alternative embodiment of the present application;

FIG. 22 is a cross-sectionals side view of the platform of FIG. 21A taken at XXII-XXII;

FIGS. 23A, 23B, and 23C are side views of a platform of the stair system according to an alternative embodiment of the present application; and FIGS. 24A, 24B, and 24C are side views of a platform of the stair system according to an alternative embodiment of the present application.

Figure 1:
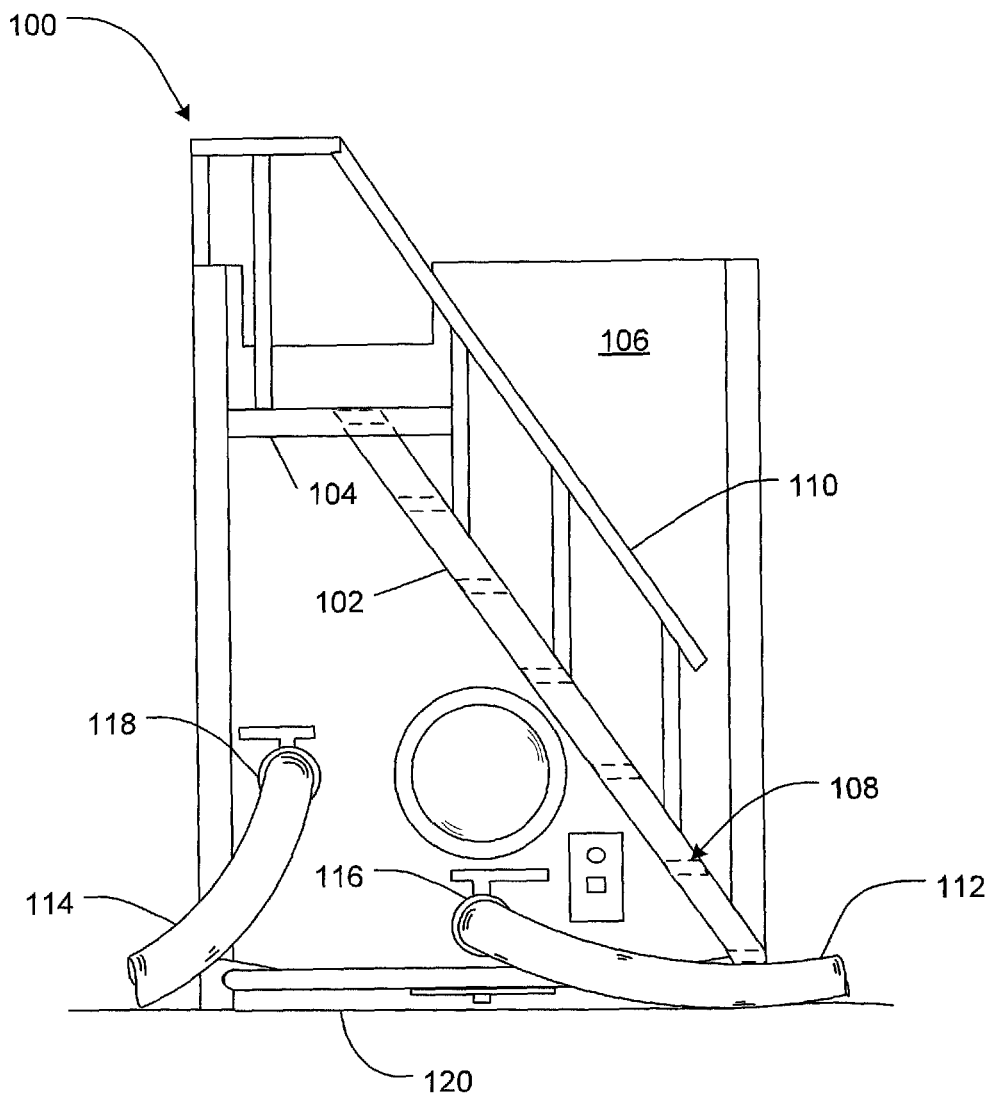
FIG. 1 is a front view of a conventional stair system for a mobile storage tank.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments are described below. In the interest of clarity, not all features of an actual implementation are described in this specification. It will of course be appreciated that in the development of any such actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system of the present application overcomes common disadvantages associated with known mobile storage tanks having rigidly attached stair systems. Specifically, one of the unique features of the mobile tank system is a removable stair system detachably coupled to the storage tank. This feature provides significant advantages, namely, the stair system is easily and rapidly removed from the tank, resulting in less time exhausted during both the painting process and replacement of a damaged stair system. Further detailed description of these features are provided below and illustration in the accompanying drawings.

The system will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2A:
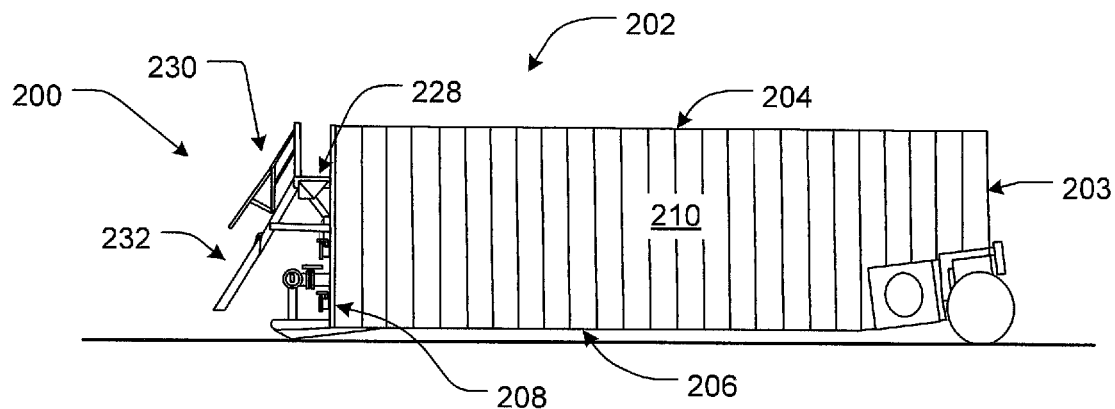
FIG. 2a is a side view of a stair system for a mobile storage tank according to the preferred embodiment wherein the stair system is shown in extended mode.
Figure 2B:
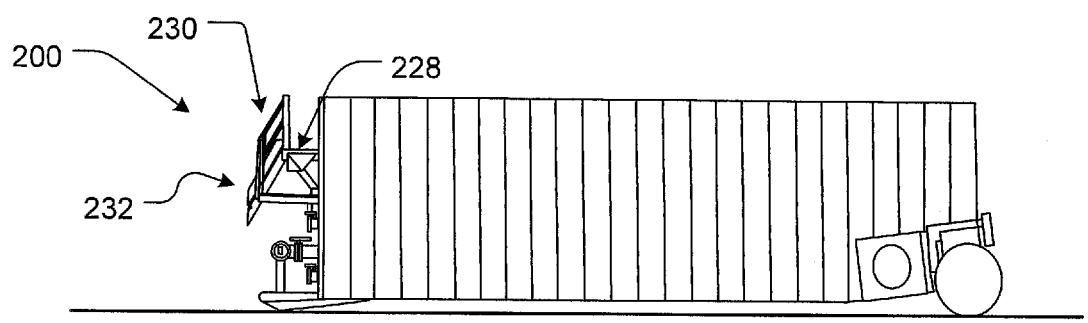
FIG. 2b is a side view of a stair system for a mobile storage tank according to the preferred embodiment wherein the stair system is shown in retracted mode.
Figure 2C:
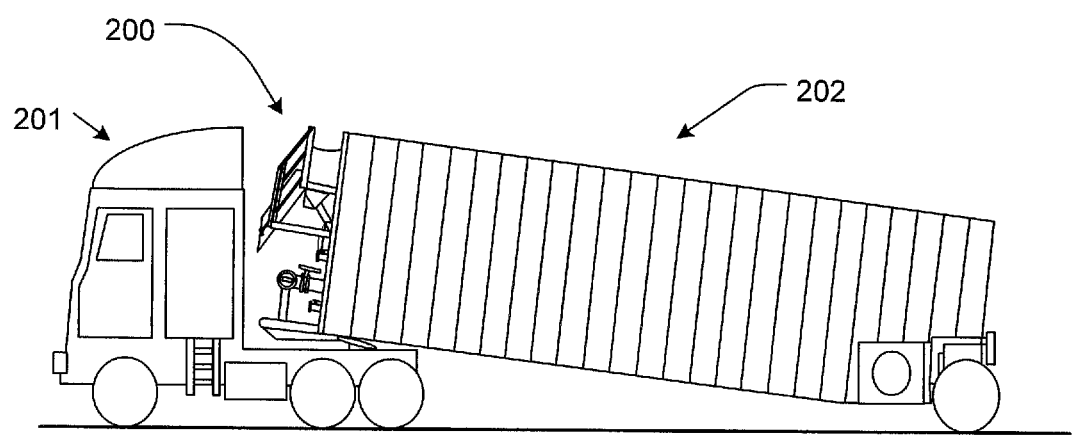
FIG. 2c is a side view of a stair system for a mobile storage tank according to the preferred embodiment wherein the stair system is shown in retracted mode.

Referring now to the drawings wherein like reference characters identify corresponding or similar elements throughout the several views, FIGS. 2a-c illustrate side views of a stair system 200 for an oilfield tank 202 according to the preferred embodiment are illustrated. FIGS. 2a, 2b, and 2c depict stair system 200 in extended and retracted, respectively. FIG. 2a shows staircase subsystem 232 and rail subsystem 230 in an extended position. This position provides a worker (not shown) access to a top surface 204 of oilfield tank 202. FIG. 2b shows staircase subsystem 232 and rail subsystem 230 in a folded position. In this position, stair system 200 is either being prepared for transit, storage, or interlinked between oilfield tanks, wherein only platform subsystem 228 is operational. For example, FIG. 6 in the drawings shows stair system 200 in a folded position. In this configuration, platform subsystem 228 forms a walkway along oilfield tanks 202A, 202B, and 202C. FIG. 2c illustrates stair system 200 in a folded position and oilfield tank 202 hitched to a tractor 201. In this position, stair system 200 is prepared for transit.

In the preferred embodiment, stair system 200 attaches to an oilfield tank 202. It should be understood that the stair system could attach to alternative surfaces, and should not be limited to oilfield tanks. For example, the stair system could attach to various types of mobile tanks, vehicles, buildings, and other similar objects or devices. In the preferred embodiment, members of stair system 200 are composed of rigid metallic materials, but it should be appreciated that alternative embodiments could include members composed of different material. For example, stair system 200 could include members composed of plastic, wood, composite, and other suitable materials.

Figure 6:
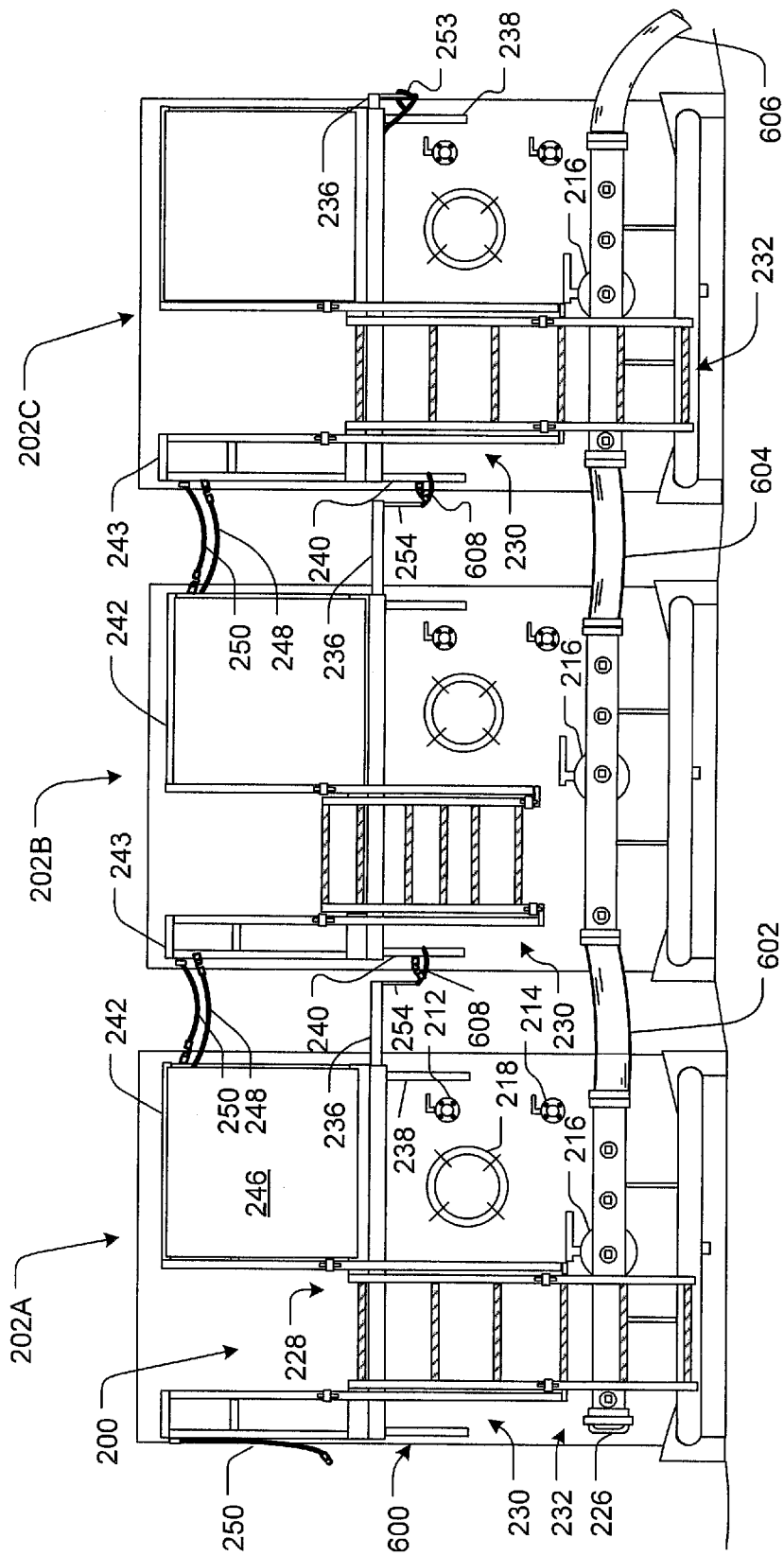
FIG. 6 is a front view of multiple stair systems according to the preferred embodiment.

FIG. 2a shows oilfield tank 202 having a rear surface 203, top surface 204, a bottom surface 206, a front surface 208, and a side surface 210. In addition, oilfield tank 202 has a side surface 600, as shown in FIG. 6. In the preferred embodiment, stair system 200 rigidly attaches to front surface 208, but could be attached to a rear or side surface in alternative embodiments.

Figure 3:
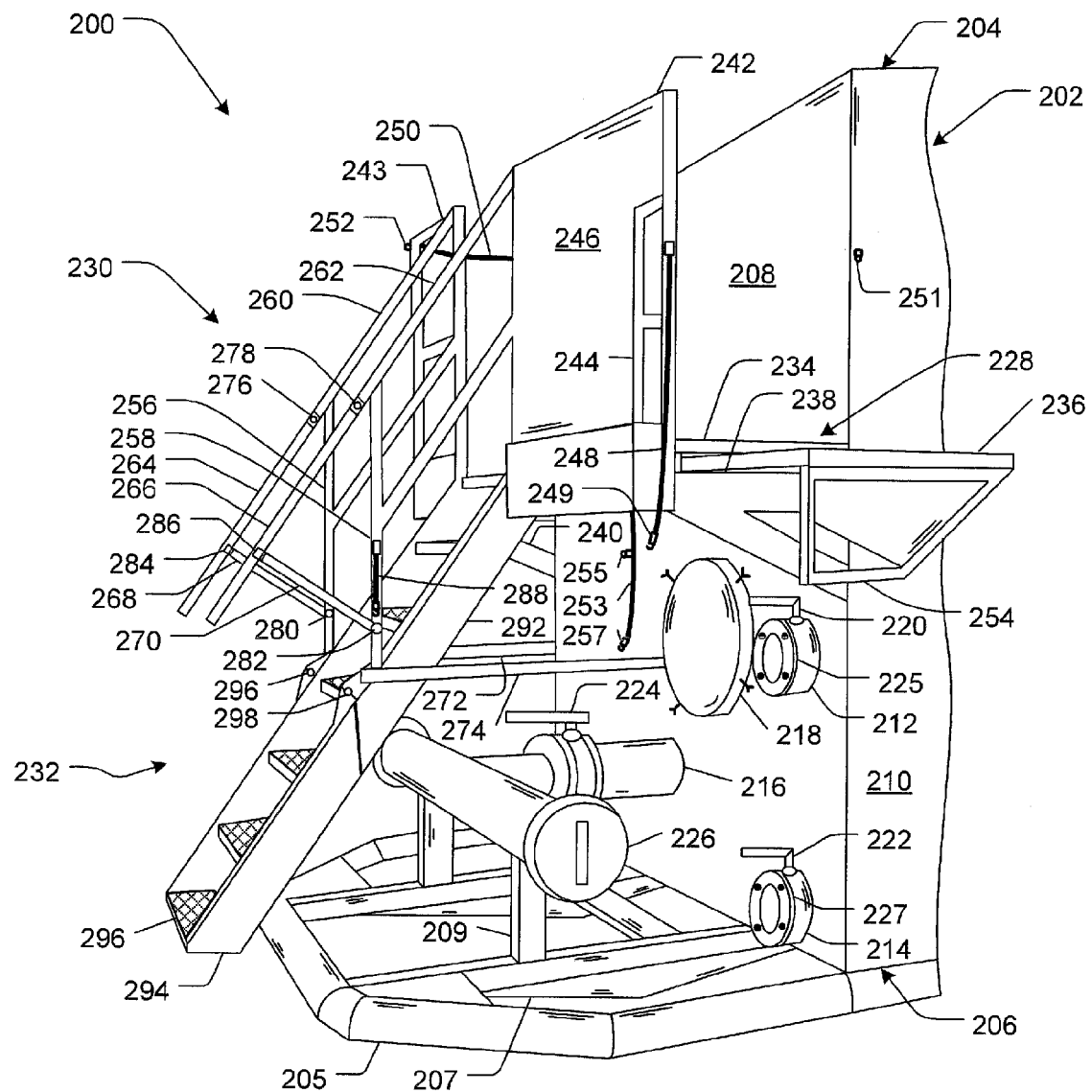
FIG. 3 is an oblique view of a stair system for a mobile storage tank according to the preferred embodiment.

Referring now to FIG. 3 in the drawings, an oblique view of stair system 200 according to the preferred embodiment is illustrated. Front surface 208 is shown carrying pipes 212, 214, 216, and 218. Pipes 212, 214, 216 and 218 extend through front surface 208 and enter into one or more chambers (not shown) carried by oilfield tank 202. The pipes provide fluid passage for fracturing fluids, drilling mud, crude oil and various other liquids or slurries. In the preferred embodiment, pipes 212, 214, 216 include manually operated valves 220, 222, and 224, respectively, for opening and closing the passage. In alternative embodiments, valves 220, 222, and 224 may include an actuator for opening and closing the passage. Tubing, as shown in FIG. 6, are coupled to pipe 216 for joining multiple oilfield tanks. In the preferred embodiment, pipe 216 is configured to direct fluid flow parallel to front surface 208. This configuration enables a worker to more easily attach tubing to adjacent oilfield tanks, however, in an alternative embodiment, pipe 216 could be designed with a configuration similar to pipes 212, 214. Pipe caps 225, 226, 227 are placed on pipe 212, 214, 216, respectively when the pipes are not being used. The pipe caps prevent unwanted materials from entering into the pipe during transit or storage. Horizontal support members 205, 207 attach to bottom surface 206. A vertical support member 209 is shown attached to horizontal support member 207. Vertical support member 209 attaches to pipe 216 for providing additional support and rigidity.

Stair system 200 comprises a unique combination of a foldable staircase and an extendable platform. In the preferred embodiment, stair system 200 includes platform subsystem 228, rail subsystem 230, and staircase subsystem 232. Platform subsystem 228 comprises a platform 234 and a retractable platform extension 236. As shown, platform 234 is attached to front surface 208 and is supported by two supporting frames 238, 240. The unique features of platform subsystem 228 are more fully discussed with reference to FIGS. 4a and 4b in the drawings. Two guard rails 242, 243 vertically attach to platform subsystem 228 for providing rigidity and security for a worker traversing platform subsystem 228. Optional stiffening support 244 attaches to guard rail 242 for additional rigidity. In the preferred embodiment, a covered surface 246 is composed of a metallic material and attaches to guard rail 242. Surface 246 provides additional rigidity and can be configured to include logos, numbers, warning signs, and other similar messages. In alternative embodiments, surface 246 may be attached to guard rail 242 by various fastening means. For example, surface 246 could be attached with magnets, flanges, tabs, connection devices, or other similar devices. In addition, surface 246 could be composed of alternative materials, such as plastic, composite, wood, or a combination thereof.

In some embodiments, the stair system 200 can include a removable barrier for at least partially blocking unprotected edges of the walkway. For example, chains 248, 250 can be used as such removable barriers. Chains 248, 250 are shown attached to guard rails 242, 243, respectively. Chain 248 includes a connection device 249 which couples to loop 251 when retractable platform extension 236 is not being used, and to a loop 252 of a similar adjacent stair system when retractable platform extension 236 is being used. Chain 250 attaches to loop 251 of a similar adjacent stair system when the retractable platform extension of that stair system is extended. The stair system 200 can also include platform securing means for securing the retractable platform extension 236 in a retracted or extended position. For example, the retractable platform extension 236 can be secured using a chain 253. Chain 253 attaches to guard rail 242 and carries a loop 255 and a connection device 257. A worker may secure retractable platform extension 236 by wrapping chain 253 around grip handle 254 and connecting connection device 257 to loop 255, as shown in FIG. 4b. In alternative embodiments, the platform securing means can include various other connection devices and loops, fastening means, such as magnets, flanges, tabs, or other connection devices.

In the preferred embodiment, stair system 200 incorporates chains 248, and 250 as removable barriers and chain 253 as a platform securing means, but it should be understood that alternative embodiments could include rope, wire, or other suitable materials in lieu of chains. In addition, alternative embodiments could replace chains 248, 250 with a rigid support member. For example, an alternative embodiment could incorporate a rigid removable or retractable barrier, such as a beam or rod that telescopes, slides, or pivots on stair system 200 or a surface of oilfield tank 202 for extending to another similar adjacent stair system. An example of a rigid retractable barrier would be a gate that pivotally attaches to the guard rail for pivotal rotation to a position substantially parallel to the front surface when the platform system is being used, and for pivotal rotation to a position substantially perpendicular to the front surface when the platform system is not being used. The rigid removable barrier provides additional support and security as a worker uses the platform subsystem.

Rail subsystem 230 includes two vertical supports 256, 258, two first hand rail members 260, 262, two second hand rail members 264, 266, and two moveable supports 268, 270. In alternative embodiments, stair system 200 can be designed without a rail subsystem or with a rail subsystem with one hand rail. In the preferred embodiment, members of the rail subsystem 230 fold when stair system 200 is in retracted mode, as shown in FIGS. 2b, 2c, 5a and 6 in the drawings. Vertical supports 256, 258 are supported by horizontal supports 272, 274 and staircase subsystem 232. First hand rail members 260, 262 rigidly attach to vertical supports 256, 258, respectively. In addition, first hand rail members 260, 262 attach to guard rail 242, 243 for additional rigidity and support. Second hand rail members 264, 266 are pivotally coupled to first hand rail members 260, 262 with pivot joints 276, 278. Pivot joints 276, 278 enable second hand rail members 264, 266 to fold to a position substantially parallel and alongside vertical support 256, 258 and enable pivotally rotation to a position substantially parallel and longitudinal to the first hand rail members 260, 262 during retracted mode.

Moveable supports 268, 270 pivotally attach to vertical supports 256, 258 with pivot joints 280, 282, respectively. Moveable supports 268, 270 provide additional support and rigidity for second hand rail members 264, 266. Pivot joints 280, 282 enable moveable supports 268, 270 to pivotally rotate to a position substantially parallel and alongside vertical support 256, 258 during retracted mode and enable pivotal rotation to a position substantially perpendicular to second hand rail members 260, 262 during extended mode. Two locking devices 284, 286 attach to distal ends of moveable supports 268, 270, respectively, for locking moveable supports 268, 270 to second hand rail members 264, 266. Securing devices 288 attaches to vertical support 258 and secures moveable supports 270 and second hand rail member 266 to a position substantially parallel to vertical supports 258. In alternative embodiments, the second hand rail members could telescope or slide within or alongside the first hand rail members. In addition, alternative embodiments could include gripping grooves or other means for providing friction, traction, and gripping operably associated with the rail members. For example, the rail members may include grip tape, a knurled surface treatment, or be embossed or engraved with various surface treatments, textures, or patterns.

In the preferred embodiment, second hand rail members 264, 266 are manually rotated; however, it should be appreciated that in alternative embodiments, rail subsystem 230 could include an actuator that rotates second hand rail members 264, 266 to a position substantially parallel to vertical supports 256, 258, respectively. For example, the actuator could be a pneumatic, hydraulic, motor, spring, or similar device that attaches to the second hand rail and an operably associated member of stair system 200 or a surface of oilfield tank 202.

Staircase subsystem 232 comprises a first staircase member 292 and a second staircase member 294, each staircase member carrying a plurality of stairs 296. In the preferred embodiment, stairs 296 are composed of grip strut for added traction as a worker climbs and descends staircase subsystem 232. It should be understood that a myriad of gratings or non-slip materials could be used in lieu of the preferred materials. For example, the grip strut could be replaced with bar grating or material that is embossed or engraved with various surface treatments, textures, or patterns.

In the preferred embodiment, first staircase member 292 is rigidly attached to platform subsystem 228 and pivotally attached to second staircase member 294 with pivot joints 296, 298. Pivot joints 296, 298 enable pivotal rotation of second staircase member 294 to a position substantially parallel and above the first staircase member 292 during retracted mode and enable pivotal rotation to a position substantially parallel and longitudinal to first staircase member 292 during extended mode. As shown in FIG. 8, alternative embodiments of staircase subsystem 232 could include an actuator 293 that rotates second staircase member 294 about pivot 298. Actuator 293 could be a pneumatic, hydraulic, motor, spring, or any suitable device. In addition, alternative embodiments may include a second staircase member that telescopes or slides within or alongside the first staircase member.

Figure 4A:
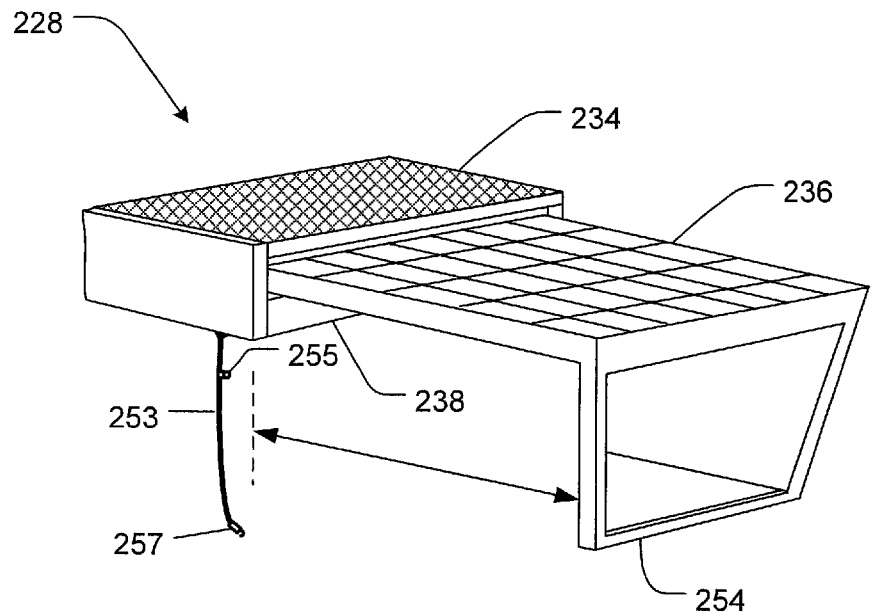
FIGS. 4a and 4b are oblique views of a platform subsystem shown in FIG. 2.
Figure 4B:
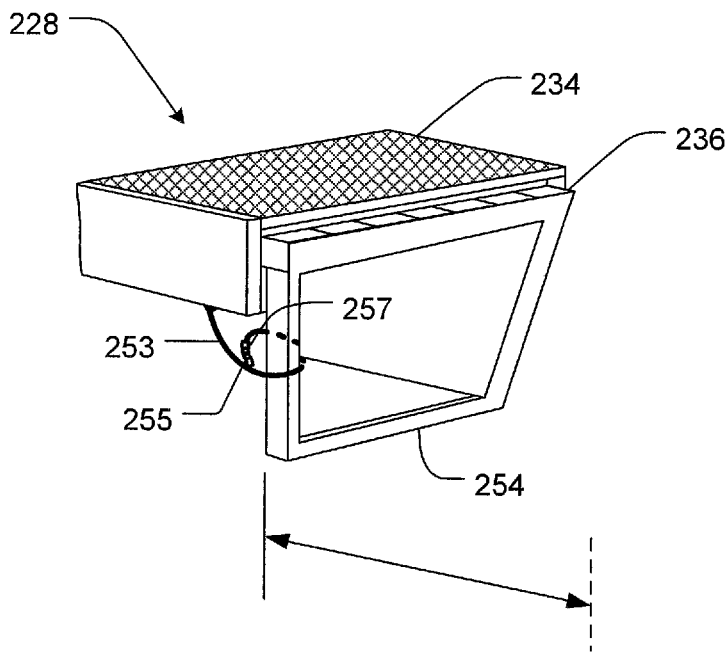

Referring now to FIGS. 4a and 4b in the drawings, oblique views of platform subsystem 228 of FIG. 3 are illustrated. Platform subsystem 228 comprises platform 234 and retractable platform extension 236. A grip handle 254 attaches to retractable platform extension 236. FIG. 4a depicts retractable platform extension 236 in an extended position, while FIG. 4b depicts retractable platform extension 236 in a retracted position. As shown in FIG. 6, an extended position is desired when creating a walkway between multiple adjacent oilfield tanks. In the preferred embodiment, platform 234 is composed of grip strut, while retractable platform extension 236 is composed of bar grating. It should be understood that platform 234 and retractable platform extension 236 could be composed of various material for increasing traction and for enabling materials, i.e., mud and water, to pass through the surface. In addition, grip strut and bar grating could be replaced with material that is embossed or engraved with various surface treatments, textures, or patterns. In the preferred embodiment, bar grating is particularly desired for the retractable platform extension because the grating does not have the grip strut's saw-toothed edges, which could cause problems when extending and retracting the retractable platform extension. It should also be understood that a removable platform extension could be used with or in lieu of platform extension 236. For example, the removable platform could be a wooden beam or any suitable device that extends from one platform system towards another.

In the preferred embodiment, platform 234 is positioned above retractable platform extension 236, and platform extension 236 slides on support 238 and other supports (not shown) located below platform 234. A stopper (not shown) is attached to the bottom of platform 234 to restrict the distance that retractable platform extension 236 may be extended. In alternative embodiments, retractable platform extension 236 could be positioned above platform 234. In addition, alternative embodiments could pivot retractable platform extension 236 about a device that attaches to platform subsystem 228 or a surface of oilfield tank 202. It should be appreciated that alternative embodiments could include a retractable platform extension that retracts and extends on both sides to the platform subsystem. In addition, alternative embodiments could include a retractable platform extension that extends the entire length of the platform.

In the preferred embodiment, retractable platform extension 236 is manually extended and retracted; however, it should be appreciated that in alternative embodiments, platform subsystem 228 could include an actuator 235 that extends and retracts retractable platform extension 236. As shown in FIG. 7 in the drawings, a block diagram shows that actuator 235 operably associates with platform subsystem 228. Actuator 235 could be a pneumatic, hydraulic, motor, spring, or a similar device that is coupled to the retractable platform extension and an operably associated member of stair system 200 or a surface of oilfield tank 202. To manually extend retractable platform extension 236, a worker can pull grip handle 254 in a direction parallel and away from platform 234. Grip handle 254 is designed to protect the worker's hands from coming in contact with support 238 or any other member of stair system 200 or a surface of oilfield tank 202.

As shown, platform subsystem 228 includes a chain 253 for securing retractable platform extension 236 in the retracted position. Chain 253 has a connection device 257 and a loop 255. FIG. 4b shows chain 253 wrapped around grip handle 254 and connection device 257 attached to loop 255. In alternative embodiments, a quick-connect type of attachment, such as a twist lock fastener or a snap fit fastener could be used in lieu of connection device 257 and 255. For example, FIG. 9 shows an alternative embodiment. In FIG. 9, bracket 237 rigidly attaches to platform extension 236 and couples with a connection device 239. It should be understood that bracket 237 and connection device 239 are not always aligned. Platform extension 236 is capable of pivoting on a pivoting device (not shown) to align bracket 237 with connection device 239. In addition, platform extension 236 may pivot due to low tolerances between the interface of platform 234 and platform extension 236. As depicted, pivotal rotation is shown with arrow D1. In the preferred embodiment, chain 253 is a chain, but it should be understood that alternative embodiments could include rope, wire, or other suitable materials in lieu of a chain.

Figure 5B:
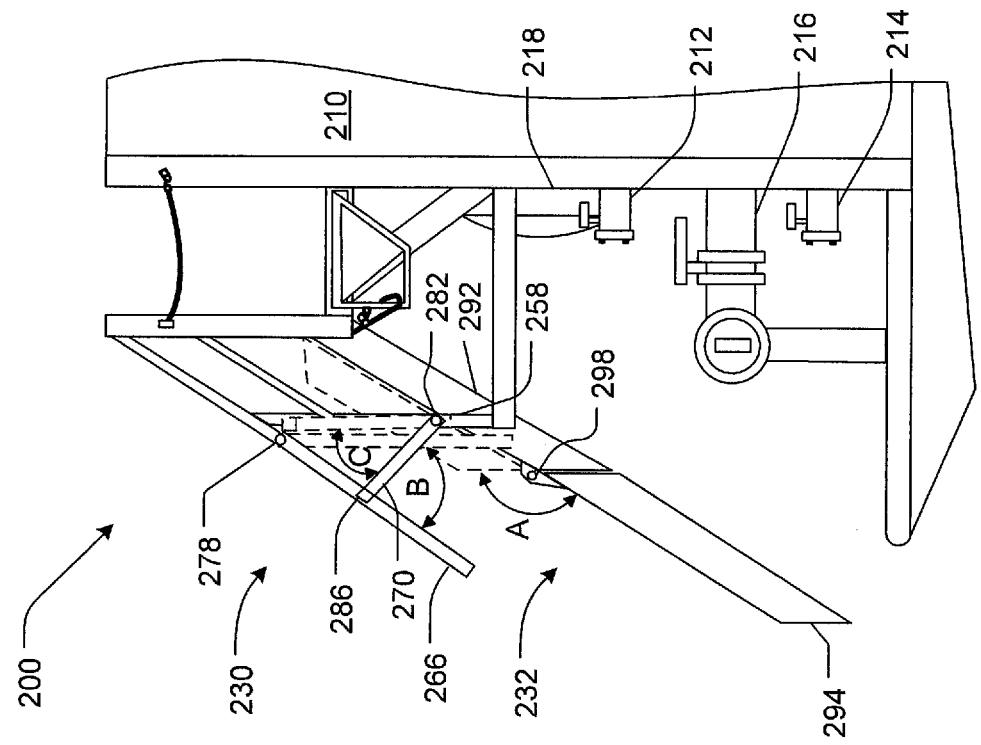
FIGS. 5a and 5b are side views of the stair system shown in FIG. 2.
Figure 5A:
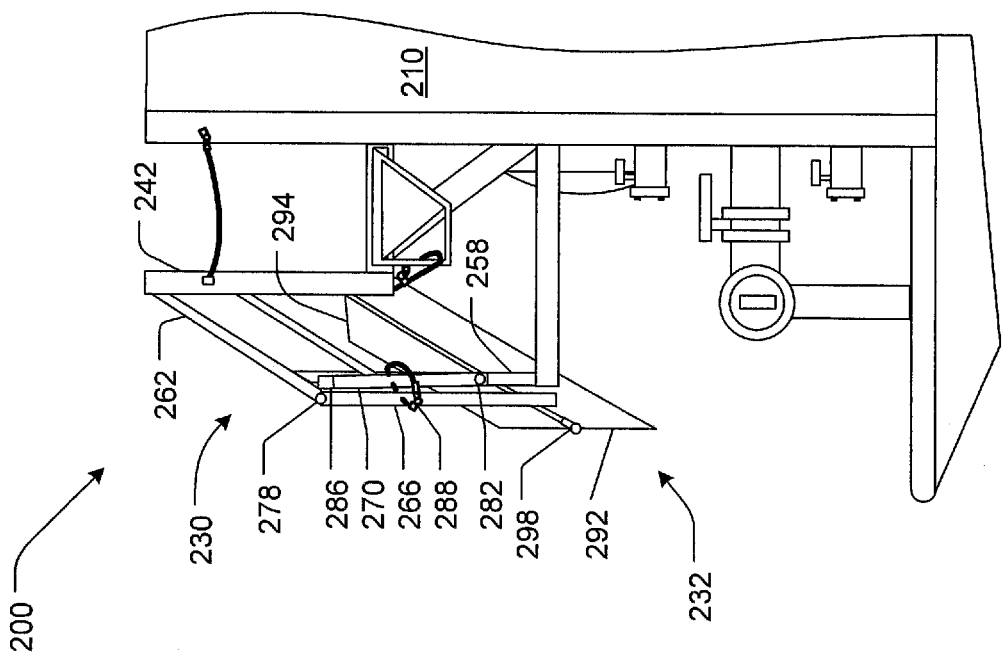

Referring now to FIGS. 5a and 5b in the drawings, side views of stair system 200 are illustrated. FIG. 5a depicts the preferred embodiment of staircase subsystem 232 and rail subsystem 230 in a folded position. In this position, second staircase member 294 is positioned substantially parallel and above first staircase member 292. A locking device (not shown) could be used to secure second staircase member 294 in this position. In the preferred embodiment, second hand rail member 266 and moveable support 270 are positioned substantially vertical and alongside vertical support 258 and secured in this position with chain 288. FIG. 5b depicts the preferred embodiment of staircase subsystem 232 and rail subsystem 230 in the folded position with dashed lines and in the extended position with solid lines. To achieve the extended position, second staircase member 294 is pivotally rotated on pivot 298 as shown with arrow A; second hand rail member 266 is pivotally rotated on pivot 278 as shown with arrow B; and, moveable support 270 is pivotally rotated on pivot 282 as shown with arrow C. In this position, moveable support 270 couples with second hand rail member 266 with locking device 286. In the preferred embodiment locking device 286 is a metal channel, but it should be appreciated that locking device 286 may be any suitable device for securing second rail handle in an extended position.

Referring now to FIG. 6 in the drawings, front views of multiple oilfield tanks 202 with stair systems 200 according to the preferred embodiment are illustrated. As shown, an oilfield tank 202A is positioned adjacent to an oilfield tank 202B and oilfield tank 202B is positioned adjacent to an oilfield tank 202C. It should be understood that FIG. 6 is a simple depiction of three oilfield tanks; whereas, the number of oilfield tanks used in a single operation could increase up to a hundred or more. As explained, the oilfield tanks are positioned side-by-side and joined together with tubing to create a large reservoir for storing and dispensing liquid. As shown, tubing 602, 604 are coupled to one end of pipes 216 of oilfield tanks 202A and 202B, 2026 and 202C, respectively. Tubing 606 is coupled to one end of pipe 216 of oilfield tank 202C and could be attached to other pipes or devices (not shown) operably associated with the oilfield operation. As shown, one end of pipe 216 of oilfield tank 202A is capped with pipe cap 226. Additional tubing could be used to interlink pipes 212, 214 between the oilfield tanks (not shown).

Staircase subsystem 232 and rail subsystem 230 are shown in the extended position on oilfield tank 202A and oilfield tank 202C and in the folded position on oilfield tank 202B. Oilfield tanks 202A and 202C show staircase subsystem 232 and rail subsystem 230 in extended mode, while oilfield tank 202B shows the subsystems in retracted mode. It should be understood that the stair system on oilfield tank 202B could be configured in extended mode. For example, as the number of oilfield tanks increase, more stair systems will be configured in extended mode so a worker is not required to walk the entire length of the walkway before descending. Retractable platform extension 236 is shown in the extended position on oilfield tank 202A and oilfield tank 202B and in the retracted position on oilfield tank 202C. As shown on oilfield tank 202C, chain 253 secures retractable platform extension 236 to support member 238. When extended, retractable platform extension 236 is secured with chain 608 by looping around grip handle 254 and support member 240. In this configuration, a walkway is formed between oilfield tanks 202A, 202B, and 202C. Chains 248, 250 are shown connected to guard rails 242, 243, respectively for added security as a worker traverses the walkway. This configuration enables a worker to climb the staircase subsystem 232 of oilfield tank 202A, traverse the walkway and descend staircase subsystem 232 of oilfield tank 202C. Hence, the danger of tripping on tubing, manifolds and other devices between oilfield tanks is mitigated. In addition, a worker no longer is required to climb and descend each stair system to access the top surface of each oilfield tank. Therefore, this configuration overcomes the problems associated with a conventional stair system for a mobile storage tank.

Figure 12:
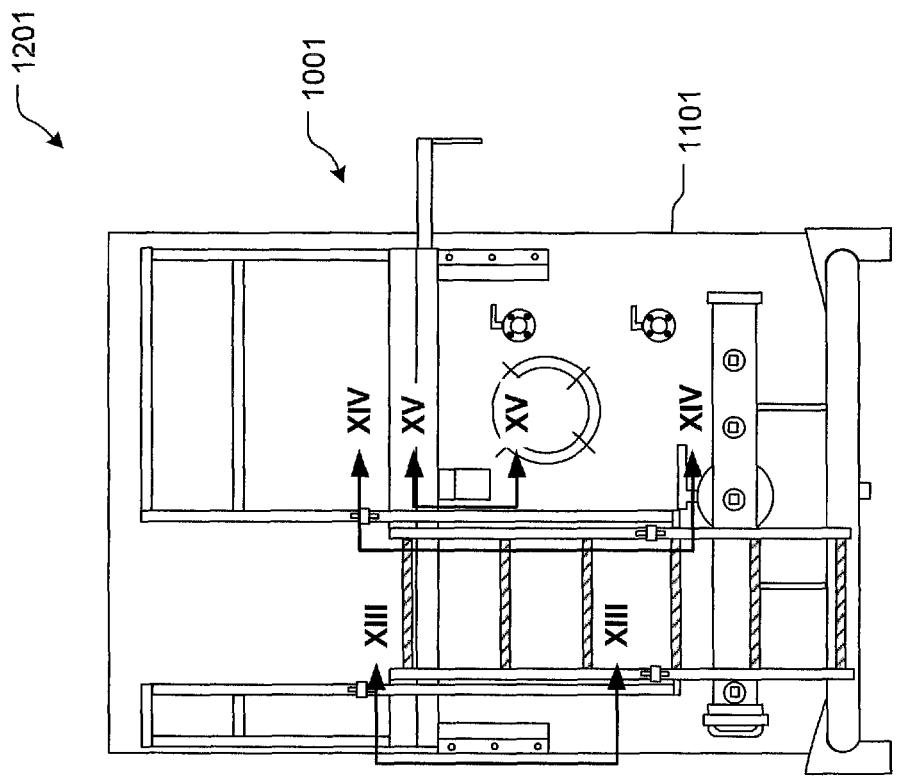
FIG. 12 is a front view of the removable stair system of FIG. 10 securely coupled to the mobile storage tank of FIG. 11.

Referring next to FIGS. 10-12 in the drawings, wherein like reference characters identify corresponding or similar elements throughout the several views, front views of an alternative embodiment of the stair systems discussed above are provided. FIG. 10 is a simplified front view of a removable stair system 1001; FIG. 11 is a simplified front view of a mobile storage tank 1101; and FIG. 12 is a front view of stair system 1001 secured to tank 1101. When combined, stair system 1001 and tank 1101 create a mobile storage tank system 1201.

One of the unique characteristics of tank system 1201 includes the feature of removing stair system 1001 from tank 1101, which provides significant advantages over known stair systems. For example, prior to use, federal regulations require the stair systems to be painted yellow for safety; whereas, the tank itself is generally painted in a different color, e.g., green or red, resulting in extensive time and effort preparing the stair system for painting. The tank system of the present application overcomes these problems by painting the stair system and the tank separately. This novel feature reduces time and effort exhausted in the painting process.

Furthermore, a removable stair system facilitates rapid replacement of a damaged stair system. For example, a tractor backs into the ladder or staircase of the stair system, which in turn damages the stair system such that the system is unusable, resulting in the stair system requiring replacement. Conventional methods include the arduous process of grinding the welded stair system from the tank, then subsequently welding a new stair system to the tank. Further detailed description of these features are provided below and illustrated in the accompanying drawings.

Referring specifically to FIG. 10, a front view of stair system 1001 is shown. Stair system 1001 is substantially similar in form and function to the stair systems discussed above, and it will be appreciated that the features discussed herein are hereby incorporated in tank system 1201, and vice-versa.

Like stair system 200, stair system 1001 includes a platform 1003 for use as a walkway and an operably associated platform extension 1005 for extending the walkway to a stair system of an adjacent storage tank (see FIG. 6). Stair system 1001 is further provided with a staircase 1007 for providing climbing access to platform 1003.

A support system 1009 is utilized as means for securing stair system 1001 to tank 1101. Support system 1009 preferably includes a first platform support 1011 and a second platform support 1013. Both platform supports 1011 and 1013 are rigidly attached to a lower surface of platform 1003 and are configured to provide rigidity and support to platform 1003 as stair system 1001 is coupled to tank 1101.

Both first and second platform supports 1011 and 1013 include an attachment means 1015 for securing stair system 1001 to tank 1101. In the preferred embodiment, attachment means 1015 includes a plurality of holes 1017 for receiving one or more fasteners, e.g., bolts. However, it is contemplated having different attachment means for securing stair system 1001 to tank 1101 in lieu of the preferred embodiment. Also, in the preferred embodiment, supports 1011 and 1013 are welded to platform 1003; however, it should be appreciated that supports 1011 and 1013 could be attached in any conventional manner known to one of ordinary skill in the art.

Support system 1009 also includes a first staircase support 1401 and a second staircase support 1403 for providing additional rigidity and support to a ladder, staircase, and/or other suitable climbing means operably associated with stair system 1001. Staircase support 1401 rigidly attaches to both platform 1003 and upper staircase member 1409 of staircase 1007, while support 1403 rigidly attaches to member 1409 and is detachably coupled to tank 1101 (see FIG. 14).

In FIG. 11, a mounting system 1103 is shown rigidly attached to a front wall 1105 of tank 1101. Mounting system 1103 is configured to secure stair system 1001 to tank 1101 via support system 1009. In the preferred embodiment, mounting system 1103 includes three platform mounts, specifically, a first mount 1107 for receiving platform support 1011, a second mount 1109 for receiving platform support 1013, and a third mount 1111 for providing additional resting support as the stair system 1001 is placed thereupon (see FIG. 15).

Mounting system 1103 further comprises means for providing additional support and rigidity to staircase 1007. Specifically, mounting system 1103 includes a first staircase mount 1113 for receiving second staircase support 1403 and a second staircase mount 1115 for receiving an additional staircase support similar to support 1403. The preferred process includes coupling staircase supports 1403 to staircase mounts 1113 and 1115 with a plurality of bolts; however, any conventional attachment means known to a person skilled in the art can be used in lieu of bolts.

First and second mounts 1107 and 1109 include one or more holes 1117 that align with holes 1017 of attachment means 1015. During assembly, a forklift elevates and subsequently rests stair system 1001 on mount 1111, which in turn is secured thereto with a plurality of bolts. Thereafter, first and second supports 1011 and 1013 are coupled to respective mounts 1107 and 1109. Lastly, staircase supports 1403 are coupled to mounts 1113 and 1115.

Figure 13:
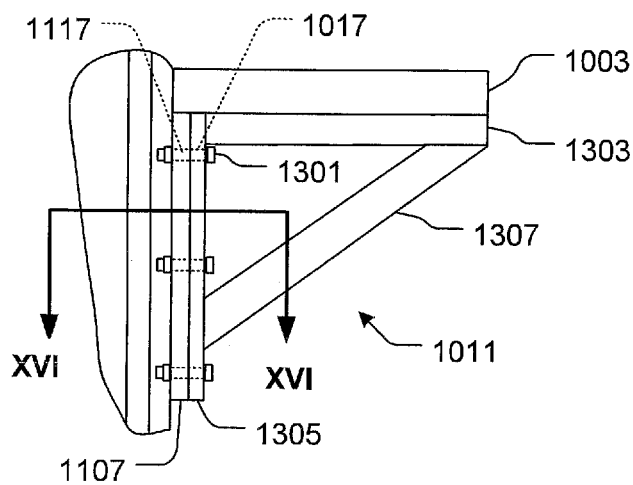
FIG. 13 is a side view of a portion of the removable stair system of FIG. 10 taken at XIII-XIII.

FIG. 13-16 depict various front and cross-sectional views of tank system 1201. In FIG. 13, a front view of support 1011 is shown coupled to mount 1107. A plurality of fasteners 1301, for example, bolts, are used to securely couple support 1011 to mount 1107. Support 1011 includes a first support member 1303 rigidly attached to platform 1003, a second member 1305 rigidly attached to member 1303, and a third member 1307 rigidly attached to both members 1303 and 1305. In the preferred embodiment, first support member 1303 forms a right angle relative to second member 1305, thus creating a relative level platform that extends in a direction normal to front wall 1105.

Figure 14:
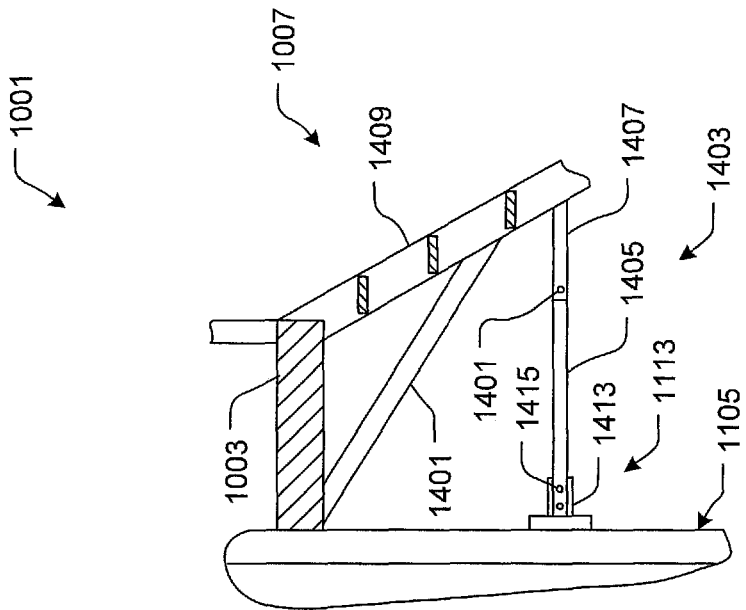
FIG. 14 is a cross-sectional side view of a portion of the removable stair system of FIG. 10 taken at XIV-XIV.

In FIG. 14, a side view of support system 1009 is shown with staircase 1007. In the preferred embodiment, staircase support 1403 includes a first section 1405 coupled to a second section 1407 via a bolt 1411. It is contemplated having second section 1407 rigidly attached to upper section 1409 of staircase 1007 and detachably coupled to first section 1405 of staircase support 1403. First section 1405 couples to section 1407 at one end and couples to staircase mount 1113 at the opposing end. Staircase mount 1113 includes a horizontal member 1413 used to securely attach first section 1405 thereto via one or more bolts 1415. In an alternative embodiment, support 1403 could be manufactured as a single support member, in lieu of sectional components, which attaches directly to staircase mount 1113.

Figure 15:
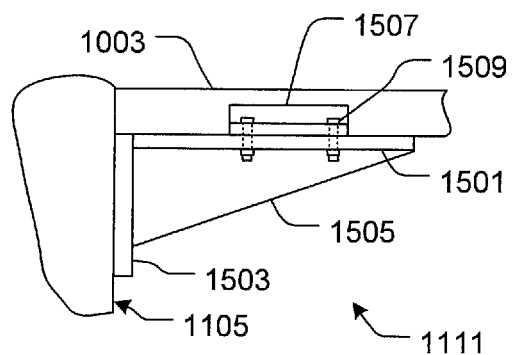
FIG. 15 is a cross-sectional side view of a portion of the removable stair system of FIG. 10 taken at XV-XV.

FIG. 15 depicts a side view of mount 1111 coupled to platform 1003. In the preferred embodiment, mount 1111 includes a first relatively horizontal member 1501 that couples to platform 1003, a second member 1503 rigidly attached to both first member 1501 and front wall 1105 of tank 1101, and a third member 1505 rigidly attached to both first member 1501 and second member 1503. A mounting bracket 1507 rigidly attaches to platform 1003 and includes an attachment means 1509, e.g., a plurality of holes for receiving a plurality of fasteners 1511.

Figure 16:
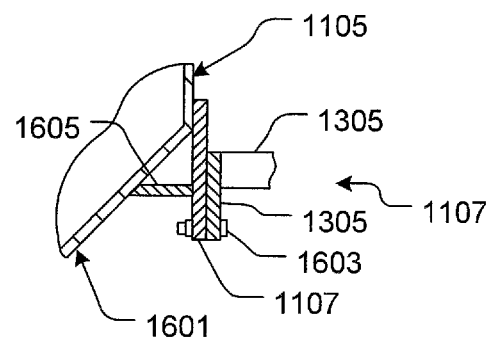
FIG. 16 is a cross-sectional view of a portion of the removable stair system of FIG. 13 taken at XVI-XVI.

FIG. 16 shows a top cross-sectional view of platform support 1011 and platform mount 1107 of FIG. 13 taken at XVI-XVI. Tank 1101 includes a surface 1601 oriented at an angle relative to front wall 1105. Surface 1601 provides access to fasteners 1603 that couple support 1011 to mount 1107. In the preferred embodiment, a member 1605 rigidly attaches to surface 1601 and platform mount 1107 for providing additional rigidity thereto. It is contemplated welding both mount 1107 and member 1605 to tank 1101 and bolting platform support 1107 thereto.

Referring next to FIGS. 17A and 17B in the drawings, front views of an alternative embodiment of tank system 1201 are shown. Tank system 1701 is substantially similar in form and function to the one or more of the stair systems discussed above, and it will be appreciated that the features discussed herein are hereby incorporated in tank system 1701, and vice-versa.

Like tank system 1201, the preferred embodiment of tank system 1701 is provided with a detachable stair system 1703 removably coupled to tank 1705 in accordance to the features discussed herein. Stair system 1703 differs from the alternative embodiment by utilizing a ladder 1707 in lieu of a staircase. In this contemplated embodiment, ladder 1707 comprises a first upper section 1709 rigidly attached to platform 1711 and pivotally attached to a second lower section 1711 via pivot joints 1715 and 1717.

In the illustrative embodiment, FIG. 17A depicts ladder 1707 in the upright and locked position ready for transport, while FIG. 17B depicts ladder 1707 in the extended position ready for climbing. Ladder 1707 is further provided with a locking mechanism 1721 preferably attached to upper section 1709 and configured to lock lower section 1711 to upper section 1709 in the locked position.

Stair system 1703 further comprise a railing system 1723 having a first rail 1725 and a second rail 1727 extending either partially or the entire length of ladder 1707. In the preferred embodiment, railing system 1723 remains offset from ladder 1707 and in a rigidly fixed position. Alternative embodiments could include a railing system that folds during the process of pivoting the lower section relative to the upper section of ladder 1707.

Figure 18A:
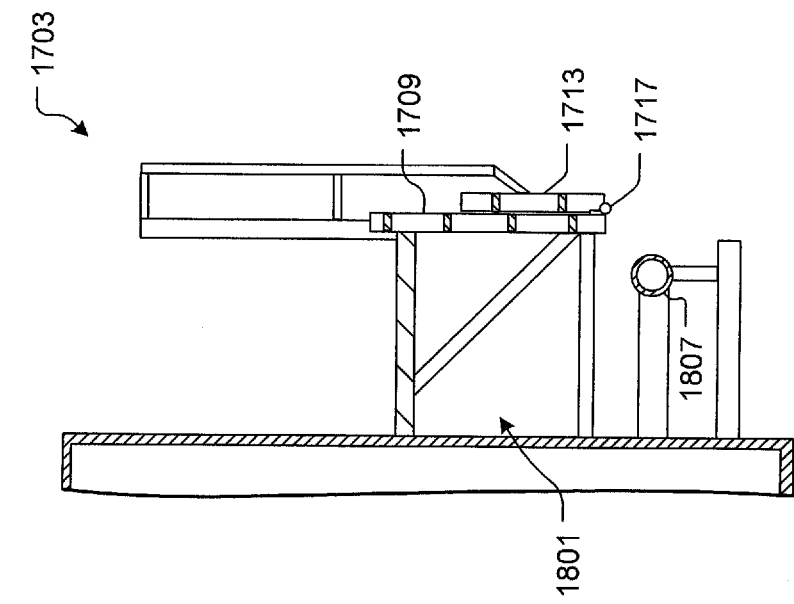
FIGS. 18A and 18B are side views of a stair system and mobile tank according to an alternative embodiment of the present application.
Figure 18B:
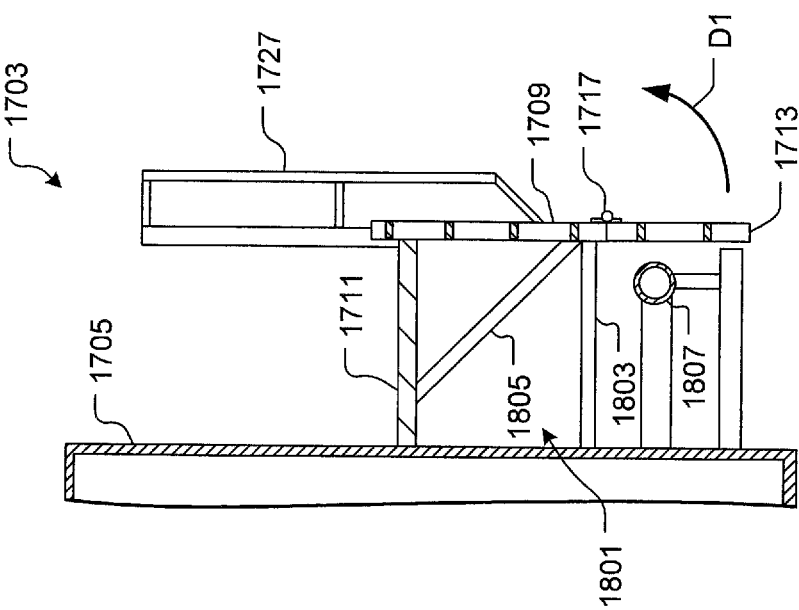

FIGS. 18A and 18B depict side views of stair system 1703 in respective extended and folded positions. Stair system 1703 further comprises a support system 1801 having a first member 1803 coupled to tank 1705, according to one or more of the mounting features discussed above, and rigidly attached to upper ladder section 1709. Support system 1801 also includes a second support member 1805 rigidly attached to platform 1711 and upper section 1709. When assembled, lower section 1711 pivots about pivot joint 1715 in the direction indicated with arrow D1 until locked with locking mechanism 1721. It will be appreciated that one of the unique features of support system 1801 is coupling ladder 1707 directly to tank 1705 in lieu of, for example, mandrel 1807.

Figures 19A, 19B:
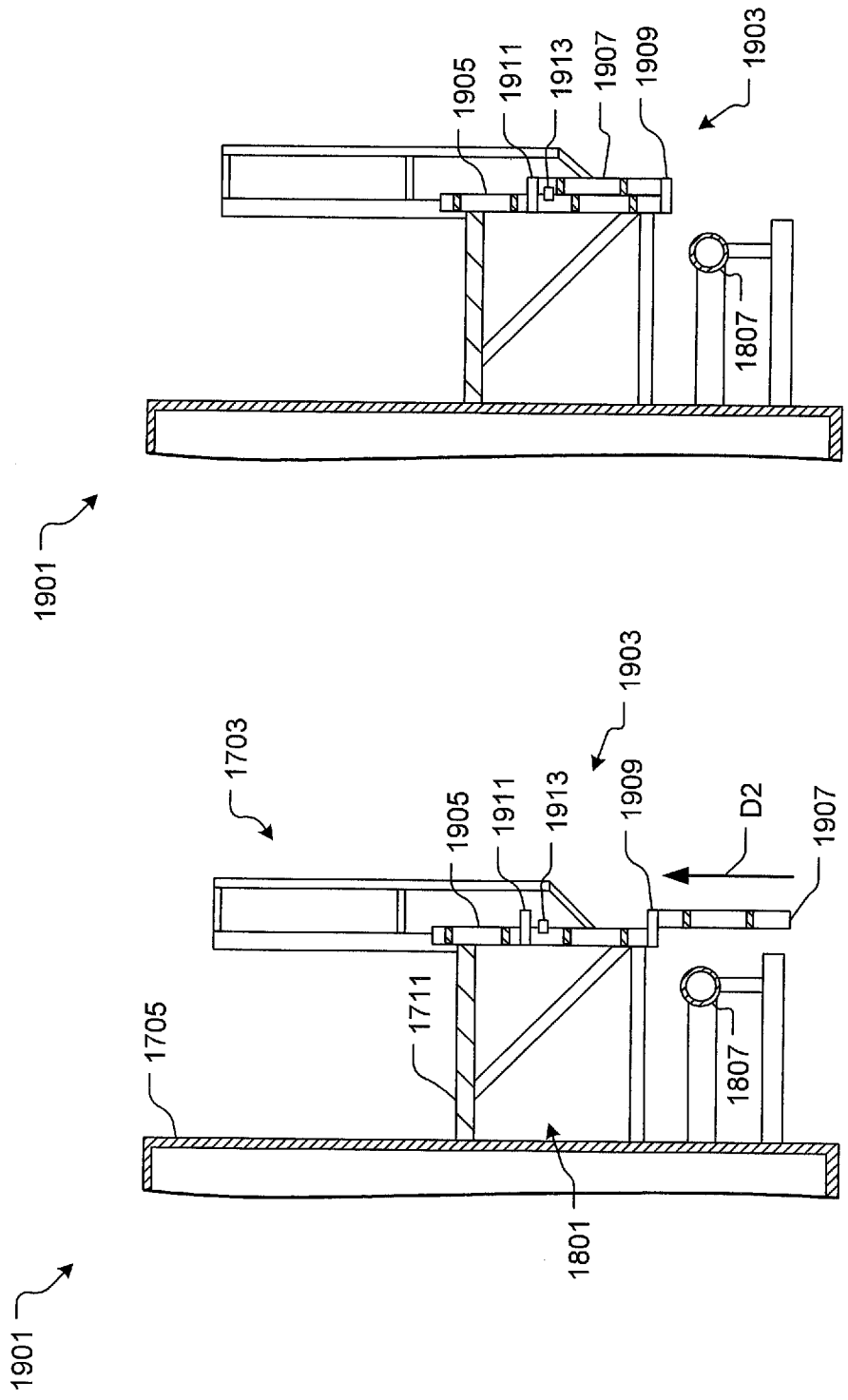
FIGS. 19A and 19B are side views of a stair system and mobile tank according to an alternative embodiment of the present application.

FIGS. 19A and 19B depict side views of an alternative embodiment of stair system 1703. FIG. 19A shows stair system 1901 in an extended position, while FIG. 19B shows stair system 1901 in a retracted position. Stair system 1901 is substantially similar in form and function to system 1703, wherein both systems utilize a ladder as means for ascending to the platform. However, in this alternative embodiment, the lower section of the ladder slides relative to the upper section. It will be appreciated that the features discussed herein with reference to stair system 1703 are hereby incorporated in stair system 1901, and vice-versa.

In this contemplated embodiment, stair system 1901 includes a ladder 1903 having a first upper section 1905 rigidly attached to platform 1711 and slidably engaged with a second lower section 1907 via two support brackets 1909 and 1911. The sliding movement of lower section 1907 relative to upper section 1905 is depicted with arrow D2. In the extended position, lower section 1907 securely engages with bracket 1909 in a locked position. A locking mechanism 1913 is utilized to lock lower section 1907 to upper section 1905 while in the retracted position.

Referring now to FIGS. 20A, 20B, and 20C in the drawings, top views of a platform system 2001 is shown according to an alternative embodiment of the present application. It will be appreciated that platform system 2001 can be utilized in one or more of the stair system embodiments discussed herein.

One unique feature believed characteristic of system 2001 is the use of a platform extension 2003 that swivels, as depicted with arrow D20, relative to platform 2005 about a joint 2007. As depicted, the platform extension is shown in a stored position in FIG. 20A, a transit position at FIG. 20B, and an extended position at FIG. 20C. Thus, like the platforms and platform extensions discussed herein with respect to the various embodiments, platform system 2001 is configured to extend the overall length of the platform 2005 via platform extension 2003 to create a continuous walkway between two or more adjacent stair systems of two or more storage tanks.

Although shown secured below platform 2005, it will be appreciated that it is also contemplated securing platform extension 2003 to an opposing top surface of platform 2005 in an alternative embodiment.

In FIGS. 21A and 21B, top views of a platform system 2001 is shown in accordance with an alternative embodiment of the present application. It will be appreciated that platform system 2101 can be utilized in one or more of the stair system embodiments discussed herein.

One unique feature believed characteristic of system 2101 is the use of a platform extension 2103 that telescopes, as depicted with arrow D21, relative to platform 2105. In the contemplated embodiment, one or more additional platform extensions 2107 could also be utilized to further extend the reach of the platform extension. As depicted, the platform extension 2103 is shown in a partially extended position in FIG. 21A and in a fully extended position in FIG. 21B.

FIG. 22 is a cross-sectionals side view of the platform system 2101 taken at XXII-XXII. In the contemplated embodiment, platform 2105 includes two tabs 2201, 2203 that form a C-shaped channel for slidably receiving platform extension 2103 therein. Likewise, platform extension 2103 includes two tabs 2205, 2207 that form a C-shaped channel for slidably receiving platform extension 2107 therein.

FIGS. 23A, 23B, and 23C are side views of a platform system 2301 according to an alternative embodiment of the present application. It will be appreciated that platform system 2301 can be utilized in one or more of the stair system embodiments discussed herein.

One unique feature believed characteristic of system 2301 is the use of a platform extension 2303 that pivots or folds, as depicted with arrow D23, relative to platform 2305 about a joint 2307. As depicted, the platform extension 2303 is shown in a stored position in FIG. 23A, a transit position at FIG. 23B, and an extended position at FIG. 23C. Thus, like the platforms and platform extensions discussed herein with respect to the various embodiments of the stair systems, platform system 2301 is configured to extend the overall length of the platform 2305 via platform extension 2303 to create a continuous walkway between two or more adjacent stair systems of two or more storage tanks.

FIGS. 24A, 24B, and 24C are side views of a platform system 2401 according to an alternative embodiment of the present application. It will be appreciated that platform system 2401 can be utilized in one or more of the stair system embodiments discussed herein.

One unique feature believed characteristic of system 2401 is the use of a platform extension 2403 that pivots or folds, as depicted with arrow D24, relative to platform 2405 about a joint 2407. As depicted, the platform extension 2403 is shown in a stored position in FIG. 24A, a transit position at FIG. 24B, and an extended position at FIG. 24C. Thus, like the platforms and platform extensions discussed herein with respect to the various embodiments of the stair systems, platform system 2401 is configured to extend the overall length of the platform 2405 via platform extension 2403 to create a continuous walkway between two or more adjacent stair systems of two or more storage tanks. Unlike system 2301, it is contemplated storing the platform extension 2403 below platform 2405 in system 2401.

It is evident by the foregoing description that the subject application has significant benefits and advantages, in particular, the stair system incorporates: (1) a staircase and a railing subsystem that are capable of folding during retracted modes; (2) a staircase and a railing subsystem that are capable of extending during extended mode; (3) a platform subsystem that creates a walkway along adjacent mobile storage tanks; (4) a removable stair system; and, (5) a stair system having an adjustable ladder. The walkway overcomes the problems associated with a conventional stair system: wasting time climbing and descending stair systems of adjacent mobile storage tanks, and mitigates the potential dangers associated with stepping over tubing, manifolds, and other similar devices operably associated with oilfield operations.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A mobile oilfield storage tank, comprising:
a front wall; and
a stair system securely coupled to the wall, the stair system having:
a continuous platform suitable for use as a walkway; and
a platform extension pivotally engaged with the platform, the platform extension being configured to selectively extend the walkway in a direction transverse to the front wall such that the platform extension provides walking access to a platform subsystem of an adjacent second mobile storage tank;
wherein the platform extension pivots from a folded position to an extended position; and
wherein the platform extension creates a continuous walkway between the platform and a platform of an adjacent mobile oilfield storage tank.

2. The mobile oilfield storage tank of claim 1, further comprising:
an adjustable staircase, having:
a first upper section rigidly attached to the platform; and
a second lower section pivotally coupled to the first upper section via a pivot joint.

3. The mobile oilfield storage tank of claim 1, further comprising:
an adjustable ladder, having:
a first upper section rigidly attached to the platform; and
a second lower section slidingly engaged with the first upper section.

4. The mobile oilfield storage tank of claim 1, wherein the platform extension slidably engages with the platform; and
wherein the platform extension retracts and extends in a transverse direction relative to the front wall.

5. The mobile oilfield storage tank of claim 1, further comprising:
an adjustable ladder, having:
a first upper section rigidly attached to the platform; and
a second lower section pivotally coupled to the first upper section via a pivot joint.

6. The mobile oilfield storage tank of claim 5, further comprising:
a support rigidly attached to the first upper section and removably coupled to the front wall;
wherein the support provides additional support and rigidly to the adjustable ladder during use.

7. The mobile oilfield storage tank of claim 1, wherein the stair system is removably coupled to the front wall.

8. The mobile oilfield storage tank of claim 7, further comprising:
a mounting system rigidly attached to the front wall; and
a support system rigidly attached to the stair system;
wherein the support system engages with the mounting system and secures the stair system to the front wall of the mobile oilfield storage tank.

9. The mobile oilfield storage tank of claim 8, wherein:
the mounting system further comprises:
a platform mount rigidly attached to the front wall; and
the support system further comprises:
a platform support rigidly attached to the platform;
wherein the platform mount and the platform support engage via an attachment means.

10. The mobile oilfield storage tank of claim 9, wherein the attachment means are a plurality of holes for receiving a plurality of bolt fasteners.

11. A mobile oilfield storage tank, comprising:
a front wall; and
a stair system securely coupled to the wall, the stair system having:
a platform suitable for use as a walkway; and
a platform extension attached to the platform about a joint that allows the platform extension to swivel relative to platform from a stored position to an extended position, the platform extension being configured to selectively extend the walkway in a direction transverse to the front wall such that the platform extension provides walking access to a platform subsystem of an adjacent second mobile storage tank.

12. The mobile oilfield storage tank of claim 11, further comprising:
an adjustable staircase, having:
a first upper section rigidly attached to the platform; and
a second lower section pivotally coupled to the first upper section via a pivot joint.

13. The mobile oilfield storage tank of claim 11, further comprising:
an adjustable ladder, having:
a first upper section rigidly attached to the platform; and
a second lower section slidingly engaged with the first upper section.

14. The mobile oilfield storage tank of claim 11, further comprising:
an adjustable ladder, having:
a first upper section rigidly attached to the platform; and
a second lower section pivotally coupled to the first upper section via a pivot joint.

15. The mobile oilfield storage tank of claim 14, further comprising:
  a support rigidly attached to the first upper section and removably coupled to the front wall;
  wherein the support provides additional support and rigidly to the adjustable ladder during use.

16. The mobile oilfield storage tank of claim 11, wherein the stair system is removably coupled to the front wall.

17. The mobile oilfield storage tank of claim 16, further comprising:
  a mounting system rigidly attached to the front wall; and
  a support system rigidly attached to the stair system;
  wherein the support system engages with the mounting system and secures the stair system to the front wall of the mobile oilfield storage tank.

18. The mobile oilfield storage tank of claim 17, wherein:
  the mounting system further comprises:
    a platform mount rigidly attached to the front wall; and
  the support system further comprises:
    a platform support rigidly attached to the platform;
  wherein the platform mount and the platform support engage via an attachment means.

19. The mobile oilfield storage tank of claim 18, wherein the attachment means are a plurality of holes for receiving a plurality of bolt fasteners.

20. A mobile oilfield storage tank, comprising:
  a front wall; and
  a stair system securely coupled to the wall, the stair system having:
    a platform suitable for use as a walkway; and
    a first platform extension slidingly secured to the platform;
    a second platform extension slidingly secured to the first platform extension;
    wherein the first platform extension and the second platform extension creates a continuous walkway between the platform and a platform of an adjacent mobile oilfield storage tank
    wherein the first platform extension and the second platform extension are configured to selectively extend the walkway in a direction transverse to the front wall such that the first platform extension and the second platform extension provide walking access to a platform subsystem of an adjacent second mobile storage tank.

* * * * *